United States Patent [19]
Walton et al.

[11] Patent Number: 5,269,128
[45] Date of Patent: Dec. 14, 1993

[54] WIRE ROPES WITH CORES HAVING ELLIPTICALLY CURVED GROOVES THEREON

[75] Inventors: John M. Walton, Sprotborough; Michael T. Burtoft, West Bessacarr, both of Great Britain

[73] Assignee: Bridon PLC, Doncaster, Great Britain

[21] Appl. No.: 902,803

[22] Filed: Jun. 24, 1992

Related U.S. Application Data

[63] Continuation of Ser. No. 603,714, Nov. 19, 1990, abandoned.

[30] Foreign Application Priority Data

May 19, 1988 [GB] United Kingdom ............... 8811807

[51] Int. Cl.$^5$ .................... D02G 3/02; D02G 3/36
[52] U.S. Cl. ...................... 57/210; 57/220; 57/225
[58] Field of Search ............... 57/210, 214, 220, 215, 57/216, 219, 225

[56] References Cited

U.S. PATENT DOCUMENTS

| | | | |
|---|---|---|---|
| 401,112 | 4/1889 | Batchelor et al. | 57/220 X |
| 403,319 | 5/1889 | Batchelor | 57/215 X |
| 586,706 | 7/1897 | Frederick | 57/219 |
| 975,541 | 11/1910 | Leschen | 57/214 |
| 1,183,487 | 5/1916 | Parker | 57/220 X |
| 2,074,956 | 3/1937 | Carstarphen | 57/220 |
| 2,480,005 | 8/1949 | Ewell | 57/147 |
| 4,120,145 | 10/1978 | Chiappetta et al. | 57/220 X |

FOREIGN PATENT DOCUMENTS

| | | |
|---|---|---|
| 65444 | 10/1972 | Luxembourg . |
| 1391355 | 4/1975 | United Kingdom . |
| 1432341 | 4/1976 | United Kingdom . |
| 2144779 | 3/1985 | United Kingdom . |

*Primary Examiner*—Daniel P. Stodola
*Assistant Examiner*—John F. Rollins
*Attorney, Agent, or Firm*—Gottlieb, Rackman & Reisman

[57] ABSTRACT

A core for wire rope has a fluted member (1) of polymeric or elastomeric material with symmetrically spaced helical grooves (2) each having the shape of an elliptical arc in cross-section in a plane normal to the core axis. The core may contain a reinforcing member, conductors, or optical fibers.

11 Claims, 5 Drawing Sheets

WIRE ROPES WITH CORES HAVING ELLIPTICALLY CURVED GROOVES THEREON

This application is a continuation of application Ser. No. 07/603,714, filed Nov. 19, 1990, now abandoned.

This invention relates to wire ropes, particularly steel wire ropes.

Traditionally the cores for wire ropes have been manufactured from natural staple fibres such as sisal, or more recently from man-made fibres such as nylon or fibrillated polypropylene yarns. For more arduous duties cores may alternatively be manufactured from steel wire, as specified for example in British Standard BS:302.

Fibre cores for wire ropes are typically manufactured in a three-strand construction, such as that shown in FIG. 2a of the accompanying drawings, which is easy to produce and offers high flexibility but does not provide very uniform support for the overlying strands of the rope, which make only intermittent contact. This disadvantage is partially overcome by the distortion of the core which takes place as the strands are compressed into it during the rope closing operation. Further compaction of the core occurs during use of the rope but this inevitably results in rope stretch which must be allowed for.

Steel cores for ropes, such as that shown in FIG. 2b, often take the form of an independent wire rope, which provides a reasonably flexible, stable support member which is particularly resistant to crushing forces. However, this type of core provides only intermittent contact with the outer strands of the rope. At these points of contact, very high compressive stresses are incurred, which frequently cause plastic yielding of the core and strand materials. These stresses contribute to the fatigue mechanisms when the rope is dynamically loaded and may cause internal wire breaks which are not easily observed.

This invention seeks to overcome the aforementioned deficiencies of the conventional core materials, by substituting a fluted core which provides a much enlarged area of contact with the outer strands. This results in lower contact stresses, less compaction of the core, and reduced rope stretch in service.

The invention provides a wire rope having a longitudinal axis, the wire rope comprising a core having a longitudinal axis coincident with the rope axis, and wire strands extending helically around the coincident rope and core axes and being symmetrically spaced around the core, each strand having an axis and comprising wires extending helically around the strand axis, the core comprising a fluted member of polymeric material having helical grooves symmetrically spaced around its outer surface, the strands being accommodated in said grooves, respectively, each strand being a round strand having a given diameter, and each groove—in cross-section in a plane normal to the longitudinal axis of the core—having the form of an arc of an ellipse whose minor axis intersects the core axis, the minor dimension of the ellipse being equal to the strand diameter.

The core is provided with helical grooves or flutes which are elliptical in profile to conform closely to the shape of the outer strands of the rope. These flutes may be formed for example by extrusion through a rotating die, the profile of which relates to the internal contours of the outer layer of strands of the rope. The fluted core can be composed of a homogeneous polymer; preferred examples of such materials are polypropylene, polyethylene, and Hytrel (Trade Mark—Dupont). However, the properties and control of manufacture of the core may be substantially improved by incorporating within the extrusion a reinforcing member or core which may for example be a plastic rod, a fibre core or an independent wire rope. The reinforcing member may be substantially equal in size to one of the strands. The reinforcing member may contain a lubricating medium, if this is compatible with the extrusion process.

During manufacture of the fluted core, which precedes the closing of the rope and may be an entirely separate operation, the pitch of the helical grooves in the core is controlled, for example by regulating the speed of the rotating die in the extruder crosshead relative to the linear speed of the rope haul-off device, to closely match the lay of the rope. Alternatively the core pitch may be made slightly shorter than the rope lay and then adjusted (untwisted) accordingly during the rope closing operation to bring it into conformity with the lay of the rope.

This has the effect of tightening up the rope structure, whereas the opposite practice of starting with a fluted core having a substantially longer pitch than the rope lay (or even straight grooves) would have the undesirable effect of slackening off the rope structure. Based on these considerations the pitch of the fluted core may be controlled to 75 to 105% of the rope closing lay, preferably to 95 to 105% of the lay, and more preferably to 95 to 100% of the lay.

The invention will be described further, by way of example, with reference to the accompanying drawings, in which.

Figure 1:
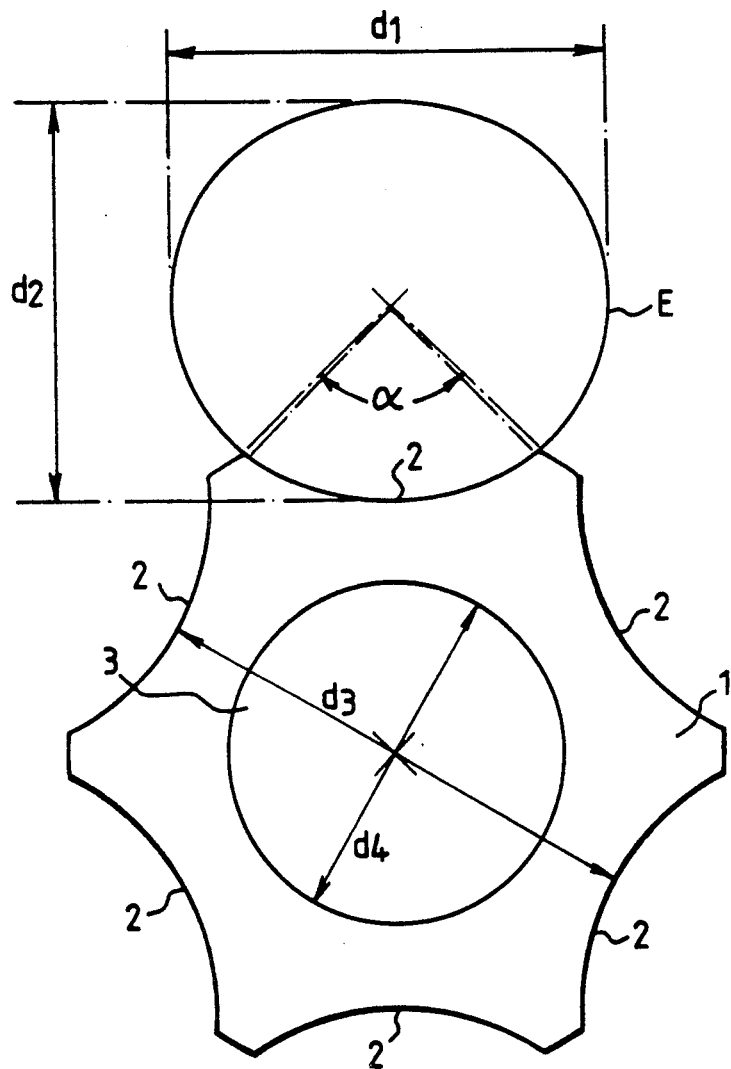
FIG. 1 is a diagrammatic cross-section through a fluted core for a wire rope according to the invention and graphically illustrates the elliptically arcuate groove configuration of the core.
Figure 2A:
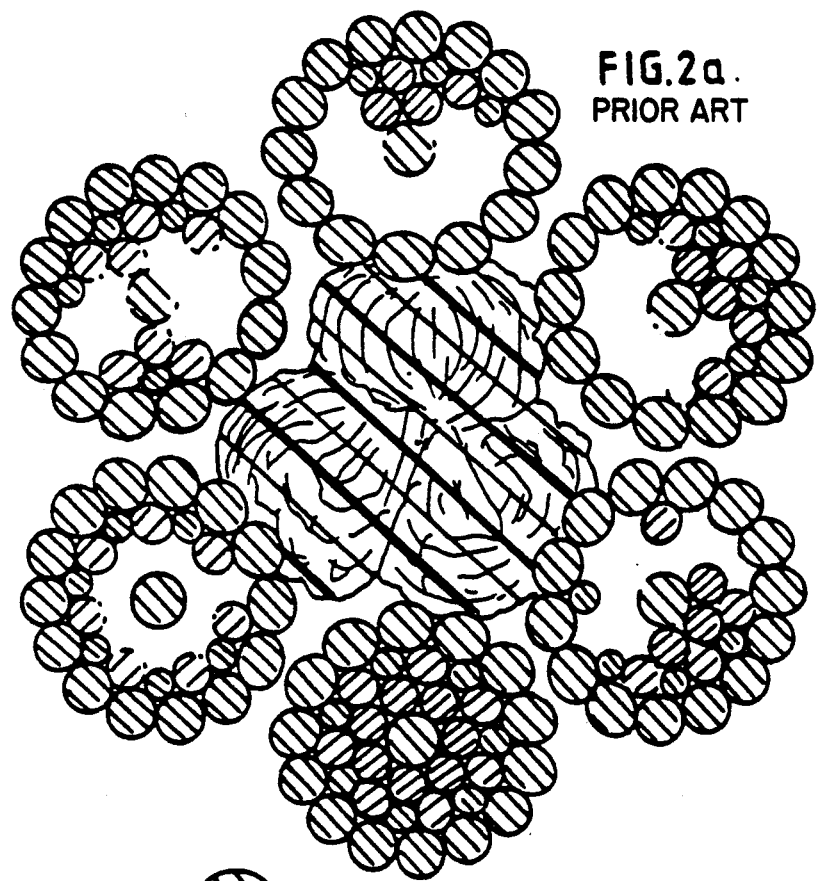
FIG. 2a is a cross-section through a 6-strand wire rope with a conventional fibre core.
Figure 2B:
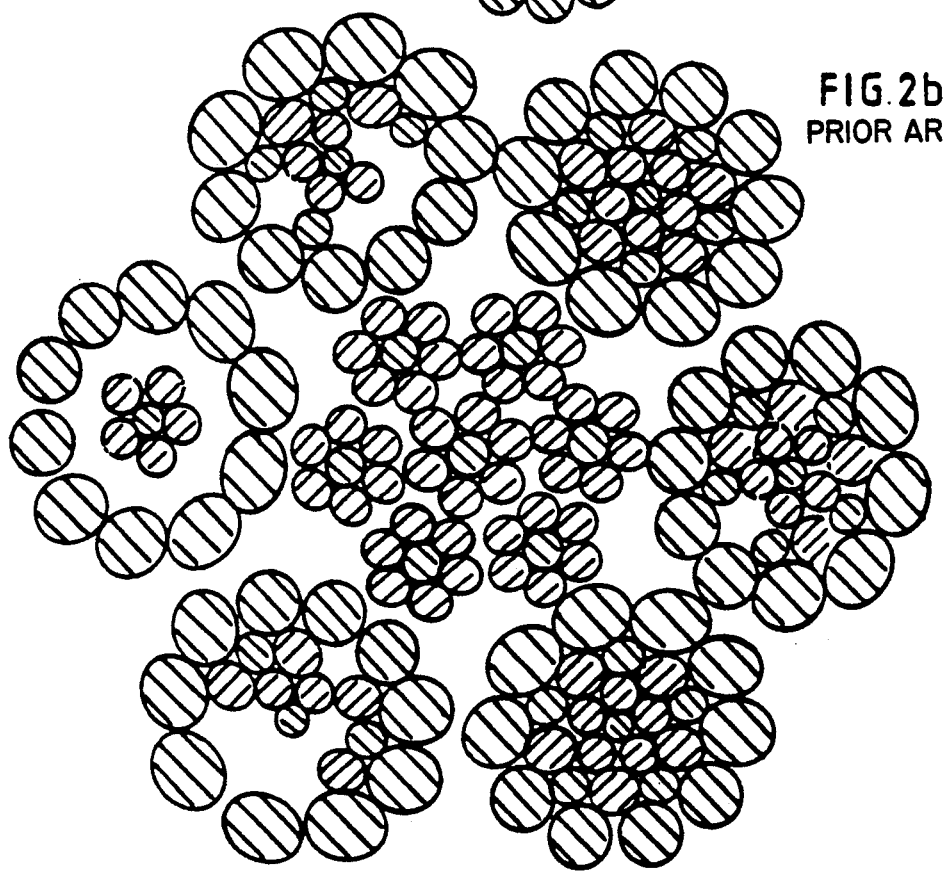
FIG. 2b is a cross-section through a 6-strand wire rope with a conventional independent wire rope core.
Figure 3A:
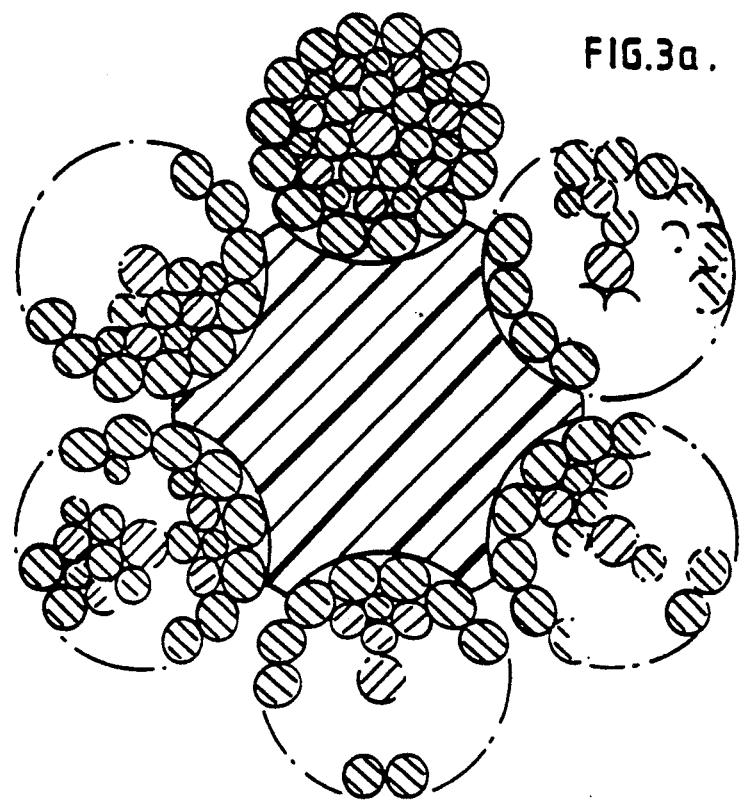
FIG. 3a is a cross-section through a 6-strand wire rope with a solid fluted core according to the invention.
Figure 3B:
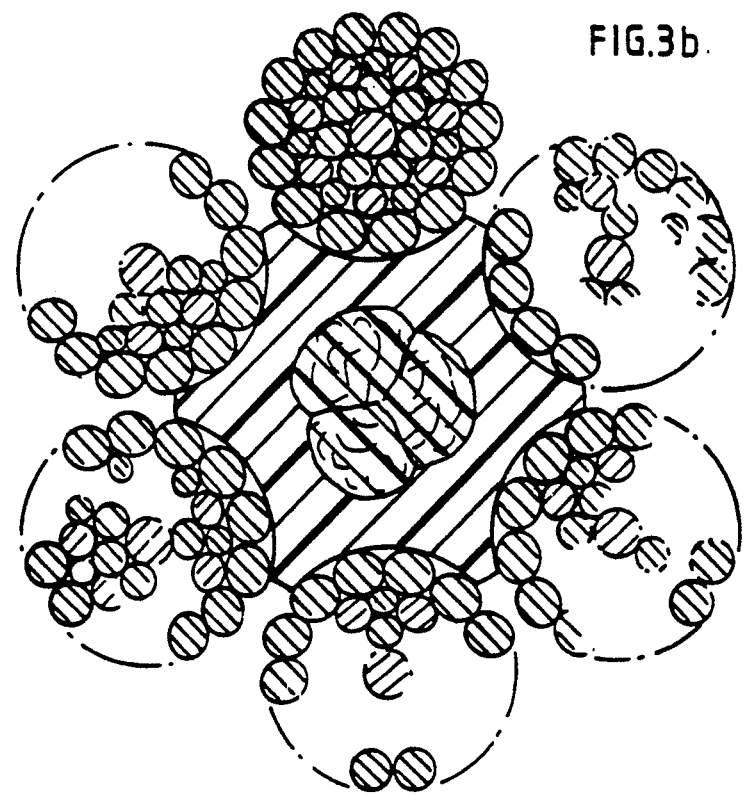
FIG. 3b is a cross-section through a 6-strand wire rope with a fluted core containing a fibre core according to a variant of the invention.

The fluted core 1 illustrated in FIGS. 1 and 3a is an extruded member of polymeric material having six shallow grooves 2 which extend helically along the core and are equally spaced around its outer surface. The profile of each groove 2 (in the cross-section normal to the axis of the core) is an arc of an ellipse E whose minor diameter extends through the centre of the core. The major dimension of the ellipse E is $d_1$ and the minor dimension is $d_2$ (equal to the diameter of the strand which is to be closed onto the core). The root diameter of the core is $d_3$. A central region 3 having a diameter, $d_4$, may be left hollow or may be occupied by a reinforcing member.

The profile of the fluted core should preferably be designed to maximise the area of contact with the outer strands by attention to the depth of the helical groove. For a six strand rope the angular arc of contact, $\alpha$, should be at least 90°, as shown in FIG. 1, in which $\alpha$ is about 95°, with corresponding larger or smaller angles, respectively, when fewer or greater numbers of strands are employed.

Figure 3C:
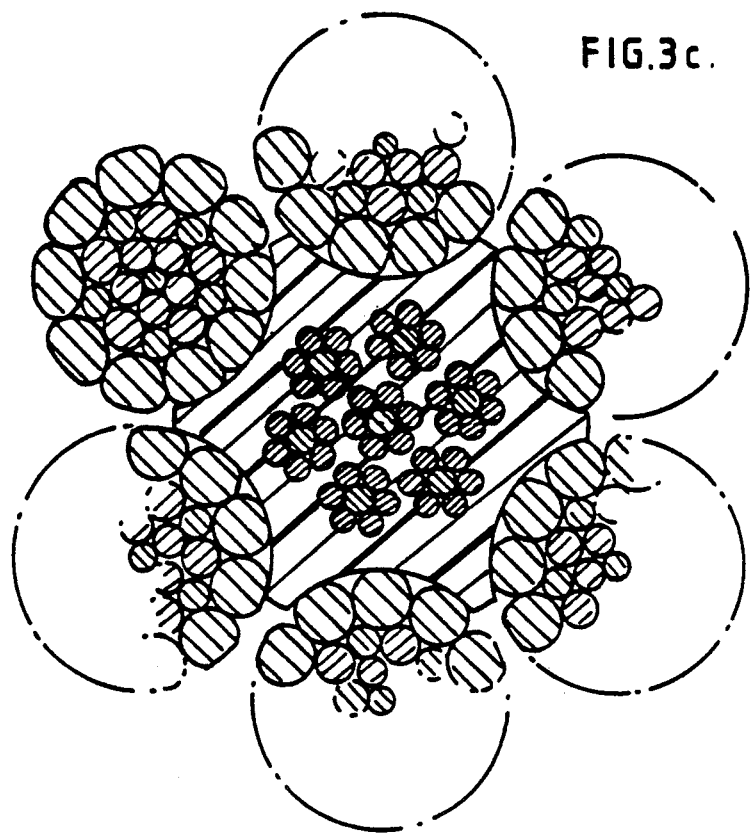
FIG. 3c is a cross-section through a 6-strand wire rope with a fluted core containing a steel core according to another variant of the invention.
Figure 4A:
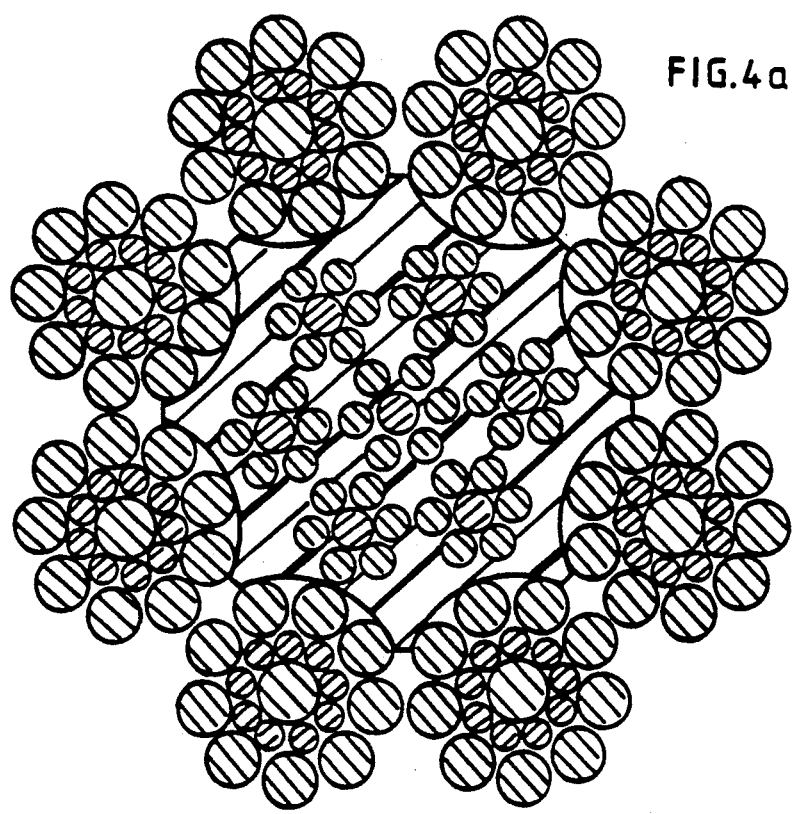
FIG. 4a is a cross-section through an 8-strand wire rope with a fluted core containing a steel core according to yet another variant of the invention.

Additional strength and stiffness may be gained by using a reinforced (e.g. glass fibre reinforced) polymeric material in the extrusion process, e.g. Verton (Trade Mark—ICI). The area of contact with the core may be further increased if the outer strands of the rope are Dyform (Trade Mark—Bridon plc) strands, which have a compacted structure in which the outer wires have external edges which lie on a generally circular locus, as shown, for example, in FIG. 3c.

Where a steel strand or rope (FIGS. 3c and 4a) is used to reinforce the fluted core, the size of the core rope may be selected to best suit the application of the finished product. For example, where maximum weight and strength are required, the diameter of the central steel member may closely approach that of the central hole in the rope, whereas for another, e.g. lightweight, application the central steel member may be only half as large.

For ropes on which a long splicing operation is to be carried out, the size of the reinforcing member may be advantageously equivalent to the outer strands of the rope so that the fluted jacket can be used to wrap the strand tails.

For applications where low rope stretch is of critical importance, the elongation characteristics of the rope may be further reduced by increasing the rope lay, for example from 6–6.5×rope diameter to 7–9×rope diameter, to reduce the pressure on the fluted core member.

Figure 4B:
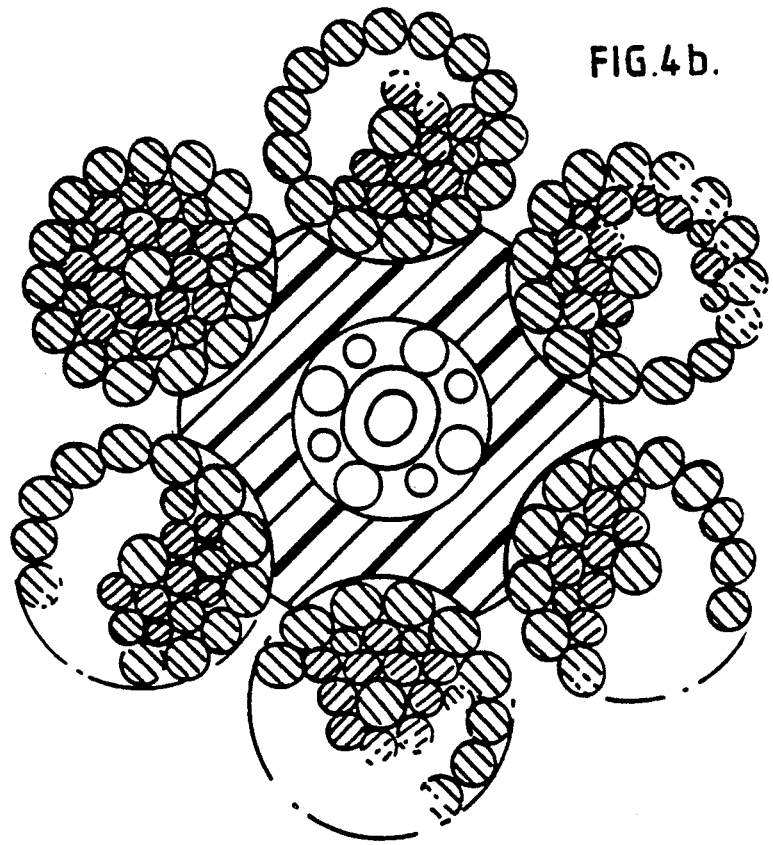
FIG. 4b is a cross-section through a 6-strand wire rope with a fluted core containing optical fibres according to still another variant of the invention.
Figure 4C:
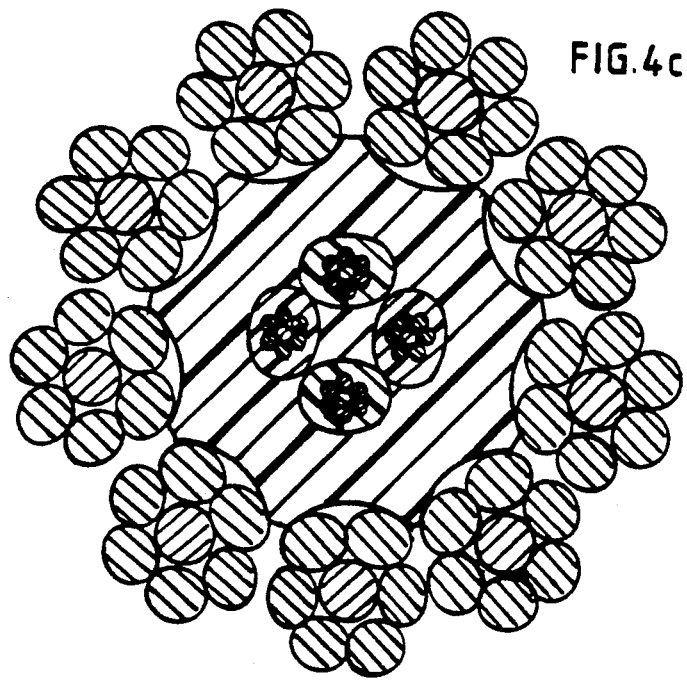
FIG. 4c is a cross-section through a 9-strand wire rope with compacted strands and a fluted core containing four insulated copper conductors according to a still further variant of the invention.

For more specialised applications the fluted core member may contain one or more insulated metallic (e.g. copper) conductors (as in FIG. 4c) or optical fibre waveguides (as in FIG. 4b).

The above-described ropes may have the following advantages:
better rope size stability;
reduced rope stretch under load;
increased bend fatigue performance (owing to exclusion of metal to metal contact);
safer mode of failure in fatigue (owing to fewer internal wire breaks);
improved rope appearance (equalisation of strand gaps);
avoidance of internal corrosion with steel reinforced rope cores.

We claim:

1. A wire rope having a longitudinal axis, the wire rope comprising a core having a longitudinal axis coincident with the rope axis, and wire strands extending helically around the coincident rope and core axes and being symmetrically spaced around the core, each strand having an axis which extends helically around the rope axis, each strand comprising wires extending helically around the strand axis, the core comprising a fluted member of polymeric material having helical grooves symmetrically spaced around its outer surface, the strands being received in said grooves, respectively, each strand having a generally circular cross-section with a given diameter, a line along the diameter of said circular cross-section and intersecting said core axis defining the minor axis of an ellipse, said ellipse having a major axis of a length greater than the length of said minor axis each groove—in cross-section in a plane normal to the longitudinal axis of the core—having the form of an arc of said ellipse, the angular extent ($\alpha$) of said arc with respect to the point of intersection of the major and minor axes of said ellipse being at least equal to $(360/n)+30$ degrees, where n is the number of grooves, whereby the strands are out of contact with one another.

2. A wire rope as claimed in claim 1, in which said fluted member has a central reinforcing member therein.

3. A wire rope as claimed in claim 2, in which said reinforcing member within said fluted member has a diameter which is 80 to 95% of the root diameter of said fluted member, said root diameter being defined by the minimum dimension of said core along a line perpendicularly intersecting the core axis.

4. A wire rope as claimed in claim 2, in which said reinforcing member within said fluted member has a diameter which is 50 to 80% of the root diameter of said fluted member, said root diameter being defined by the mimimum dimension of said core along a line perpendicularly intersecting the core axis.

5. A wire rope as claimed in claim 1, containing at least one insulated conductive element or optical fibre waveguide.

6. A wire rope as claimed in claim 1, in which the material of said fluted member contains discontinuous reinforcing fibres.

7. A wire rope as claimed in claim 1, in which the helical pitch of said grooves of said core, prior to the assembly of the core with said strands and while unrestrained by said strands, is 75 to 105% of the helical pitch of said strands when the same extend around said core in the rope.

8. A wire rope as claimed in claim 7, in which the helical pitch of the grooves of said unrestrained core is less than the pitch of said strands in the rope.

9. A wire rope as claimed in claim 7, in which the helical pitch of said grooves of said core, prior to the assembly of the core with said strands and while unrestrained by said strands is 95 to 105% of the helical pitch of said strands when the same extend around said core in the rope.

10. A wire rope as claimed in claim 7, in which the helical pitch of grooves of said core, prior to the assembly of the core with said strands and while unrestrained by said strands is 95 to 100% of the helical pitch of said strands when the same extend around said core in the rope.

11. A wire rope as claimed in claim 1, in which each strand—in cross-section normal to the axis of that strand—has a compacted structure in which the outer wires have external edges which lie on a generally circular locus.

* * * * *